United States Patent [19]

Kinanen et al.

[11] Patent Number: 5,157,264

[45] Date of Patent: Oct. 20, 1992

[54] SUPPORT FOR SLIDING RADIOGRAPHIC PLATE IN A MAGAZINE

[75] Inventors: Ilmari Kinanen, Espoo; Matti Rantanen, Kirkkonummi; Pertti Sormunen, Vantaa, all of Finland

[73] Assignee: Orion-Yhtyma OY, Espoo, Finland

[21] Appl. No.: 737,778

[22] Filed: Jul. 30, 1991

[30] Foreign Application Priority Data

Jul. 30, 1990 [FI] Finland .................................. 903801

[51] Int. Cl.$^5$ .............................................. G03B 42/04
[52] U.S. Cl. .................................. 250/484.1; 378/182
[58] Field of Search .......................... 250/484.1, 327.2; 378/181, 182

[56] References Cited

U.S. PATENT DOCUMENTS

| | | | |
|---|---|---|---|
| 4,181,418 | 1/1980 | Fechtner et al. | 354/277 |
| 4,186,308 | 1/1980 | Erikson . | |
| 4,618,979 | 10/1986 | Koyama | 378/176 |
| 4,827,136 | 5/1989 | Bishop, Jr. et al. | 378/182 |
| 4,937,605 | 6/1990 | Hoffman, Jr. | 354/276 |
| 5,065,866 | 11/1991 | Boutet et al. | 378/182 |

*Primary Examiner*—Carolyn E. Fields
*Attorney, Agent, or Firm*—Pettis & McDonald

[57] ABSTRACT

The invention relates to a supporting system of a sliding plate of a magazine comprising a magazine case and a sliding plate which travels in a linear direction inside the magazine case. The system is comprised of a guide bar that is secured to the lower cover of the magazine, parallel to the longitudinal axis of the lower cover. The sliding plate rests upon the guide bar and upon support screws arranged on the end part of the magazine case against the front portion of the sliding plate.

7 Claims, 2 Drawing Sheets

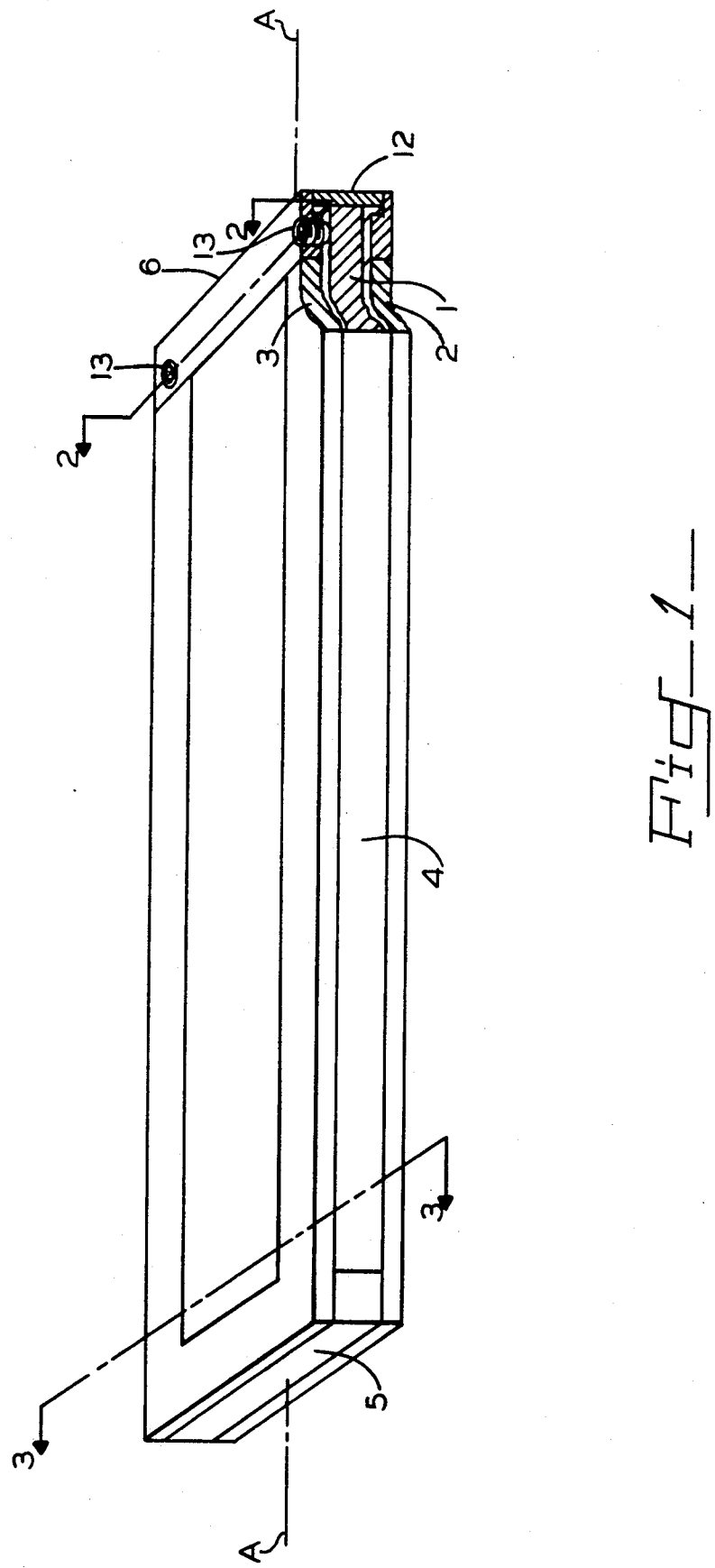
Fig_1

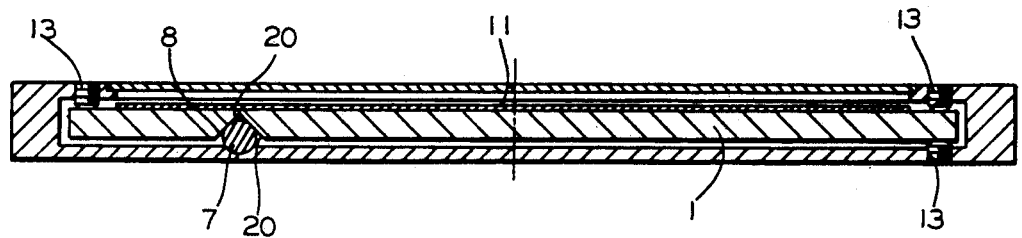
Fig_2_
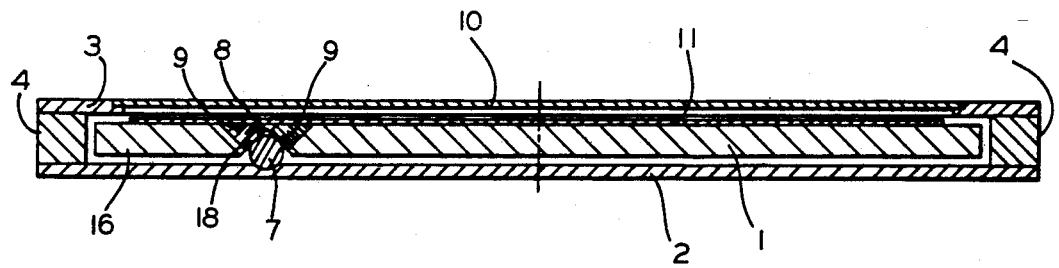
Fig_3_

SUPPORT FOR SLIDING RADIOGRAPHIC PLATE IN A MAGAZINE

BACKGROUND OF THE INVENTION

This invention relates to a supporting system for a sliding plate inside a magazine which is used, for example, in X-ray examinations, with the sliding plate supported in the magazine case, ensuring a uniform linear direction of the sliding plate.

A subject of the X-ray examination is photographed on a radiographic plate (RIM-plate) often having a stimulable phosphor thereon, which is attached to the surface of a sliding plate. The sliding plate, with the radiographic plate attached, is placed inside a light-tight magazine. The exposure of the magazine is carried out by irradiation, whereupon the magazine is transferred to the reading device of the RIM-plate, or the scanner. The sliding plate moves in a linear direction inside the magazine so that it can be drawn out of the magazine for the length of time required for the reading in the scanner. The end of the sliding plate is grasped in the scanner, for example by a magnet, and the plate is drawn out of the magazine for the time of the reading. The reading of the information on the RIM- plate is carried out by a laser beam, a light guide and a light detector. During the RIM-plate reading, the linear movement of the sliding plate over the point where the reading takes place must be extremely uniform, accurate and precise.

The magazines presently used comprise a sliding plate support which does not offer a sufficiently accurate linear movement for the reading.

Since the support in the magazine case is not sufficient, the radiographic plate must be fully drawn out of the magazine case for the time of the reading. The plate is placed on a belt conveyor and the reading is carried out by moving the plate on the belt past the reading point.

If the support of the magazine sliding plate is so constructed that the linear movement of the sliding plate inside the magazine case is sufficiently accurate and precise, the reading of the RIM-plate can be carried out without having to fully draw the sliding plate out of the magazine case. This would speed up and simplify the reading of the RIM-plate. The present invention offers a solution to this problem.

SUMMARY OF THE INVENTION

The invention is directed to the supporting of a magazine sliding plate which enables an accurate linear movement of the sliding plate required for the reading of the RIM-plate. The essential features of the invention are disclosed in the appendant claims.

BRIEF DESCRIPTION OF THE DRAWINGS

For a fuller understanding of the nature and objects of the invention, reference should be had to the following detailed description taken in connection with the accompany drawings, in which:

FIG. 1 is a partial sectional perspective view of the magazine;

FIG. 2 is a cross-sectional view of the magazine illustrating the support system according to one embodiment of the invention, taken along line 2—2 of FIG. 1; and FIG. 3 is a cross-sectional view of the magazine illustrating the support system according to another embodiment of the invention, taken along line 3—3 of FIG. 1.

Similar reference characters refer to similar parts throughout the several views of the drawings.

DETAILED DESCRIPTION

FIG. 1 shows a magazine case which has sliding plate 1 arranged inside thereof. The magazine case consists of lower cover 2 and upper cover 3, opposing lateral side members 4, back edge 5 and end part 6. The lower and upper covers and the side edges of the magazine case, when desired, can be replaced by a single extruded part.

The support system according to the invention, shown in FIG. 2, comprises a guide bar 7 secured to lower cover 2 of the magazine, on which bar 7 and the sliding plate 1 is supported. The lower cover has a longitudinal axis "A" that is generally equidistant from and parallel to the lateral side members 4. Guide bar 7 is preferably secured to the lower cover 2 parallel to and offset from axis "A." In the preferred embodiment, the guide bar 7 has been machined and polished to a cylindrical shape with a circular cross-section. The bar is ground and polished until it is very straight and smooth.

Sliding plate 1 is supported on guide bar 7, and under the sliding plate 1 there is provided a V-groove 8 extending inwardly into one side of the plate. The "V" groove extends parallel and adjacent to the guide bar 7. At least a portion of the groove engages the guide bar 7. The groove has a sliding surface 20 formed onto it which is made of material having a low friction coefficient. Thus, the entire length of the sliding plate in this embodiment is linearly supported on the guide bar. In another embodiment of the invention as shown in FIG. 3, the sliding plate is supported at a plurality of points on guide bar 7. Two points are created at the rear portion 16 of the sliding plate 1 by two support screws 9 shown in FIG. 3. The first ends 18 of the support screws 9 project through the surface of the groove 8 contacting the guide bar 7. The sliding plate travels on these screws 9 linearly along guide bar 7. The support screws are made of material having a low friction coefficient.

FIG. 3 also shows prepreg carbon fiber sheet 10 (or a corresponding sheet) which is glued to the upper cover of the magazine and which enables the irradiation of the magazine to be carried out through the side facing RIM-plate 11. RIM-plate 11 is supported by sliding plate 1.

According to the invention, the tilting of the slide plate on top of the guide bar is prevented by support screws 13, that are made of material with a low friction coefficient, and are arranged on end part 6 of the magazine case, the end where the sliding plate is drawn out with its end plate 12 for the time of the reading. Support screws 13 are arranged on end part 6 of the magazine case so that two screws 13 are located on a portion of the end part 6 that is adjacent to the upper cover 3 with each screw proximal to a respective side member 4. Another support screw 13 is located on a portion of the end part 6 that is adjacent the lower cover and is proximal to one side member 4 of the case. These support screws 13, together with the support provided by guide bar 7, are sufficient to ensure a uniform and reliable linear movement of sliding plate 1 inside the magazine case. The number of support screws is not limited, two screws 13 may be arranged on end part 6 adjacent to the lower cover with one each proximal to a respective side member 4. If desired, a collision stop can be attached to the sliding plate to prevent it from coming completely out the magazine case.

Nylon, tetrafluoroethylene or a corresponding material can be used as material having a low friction coefficient.

Now that the invention has been described,
What is claimed is:

1. A radiographic plate support system comprising:
   a magazine case comprising two opposing lateral side members and a lower cover extending therebetween, said lower cover having a interior surface, said lower cover having a longitudinal axis generally equidistant from and extending parallel to said side members, and said case further comprising an open end part;
   a guide bar secured to said lower cover and extending generally parallel to said longitudinal axis;
   slidable plate comprising means for supporting a radiographic plate, said slidable plate being slidably insertable into said case through said open end part of said case, at least a portion of said slidable plate slidably supported by said guide bar, and said slidable plate having a first side and a second side and each side having a front portion; and
   a plurality of support screws each having a first end, said screws arranged on said end part of said case such that said first end of at least one said screw is adjacent said front portion of at least one said side of said slidable plate.

2. A support system according to claim 1 wherein said guide bar is secured to said interior surface of said lower cover offset from said longitudinal axis of said lower cover.

3. A support system according to claim 1 wherein said slidable plate further comprises a "V"-shaped groove extending inwardly of one said side of said slidable plate, said groove sized and configured such that at least a portion of the surface of said groove slidably engages said guide bar, at least a portion of said surfaces of said groove being comprised of material having a low coefficient of friction.

4. A support system according to claim 3 wherein said material having a low coefficient of friction is nylon.

5. A support system according to claims 3 wherein said material having a low coefficient of friction is a tetrafluoroethylene.

6. A support system according to claim 1 wherein said slidable plate further comprises a "V"-shaped groove extending inwardly of one said side of said slidable plate, said groove sized and configured such that at least a portion of the surface of said groove slidably engages said guide bar, and said slidable plate having a rear portion, and two support screws extending outwardly from a segment of said groove located on said rear portion of said slidable plate; and said screws being comprised of material having a low coefficient of friction.

7. A support system according to claim 1 wherein said magazine case further comprises:
   an upper cover extending between said two opposing lateral side members and said support screws comprising material with a low coefficient of friction and being arranged on said end part and arranged such that,
   two screws are located on a portion of said end part adjacent said upper cover with each screw located proximal to a respective said opposing side member of said case, and
   one said screw is located on a portion of said end part adjacent said lower cover proximal to one said side member of said case.

* * * * *

UNITED STATES PATENT AND TRADEMARK OFFICE
CERTIFICATE OF CORRECTION

PATENT NO. : 5,157,264
DATED : Oct. 20, 1992
INVENTOR(S) : Kinanen et al.

It is certified that error appears in the above-identified patent and that said Letters Patent is hereby corrected as shown below:

Claim 1, column 3, line 11, change "a" to --an--; and

Claim 1, column 3, line 18 insert --a-- at the beginning of the line.

Signed and Sealed this

Fifth Day of October, 1993

Attest:

BRUCE LEHMAN

*Attesting Officer*    Commissioner of Patents and Trademarks